United States Patent
Carter et al.

(10) Patent No.: US 11,141,794 B2
(45) Date of Patent: Oct. 12, 2021

(54) HANDHELD WOOD THREAD CUTTING TOOL

(71) Applicant: CARTER AND SON TOOLWORKS LLC, Seattle, WA (US)

(72) Inventors: Paul Carter, Seattle, WA (US); David Carter, Seattle, WA (US); Mike Mahoney, Mount Aukum, CA (US)

(73) Assignee: CARTER AND SON TOOLWORKS LLC, Seattle, WA (US)

( * ) Notice: Subject to any disclaimer, the term of this patent is extended or adjusted under 35 U.S.C. 154(b) by 214 days.

(21) Appl. No.: 16/506,788

(22) Filed: Jul. 9, 2019

(65) Prior Publication Data

US 2021/0008632 A1 Jan. 14, 2021

(51) Int. Cl.
*B27G 15/00* (2006.01)
*B23B 27/06* (2006.01)
*B23B 5/48* (2006.01)
*B25G 3/26* (2006.01)
*B25G 1/10* (2006.01)

(52) U.S. Cl.
CPC .............. *B23B 27/065* (2013.01); *B23B 5/48* (2013.01); *B25G 1/102* (2013.01); *B25G 3/26* (2013.01); *B27G 15/00* (2013.01); *B23B 2210/00* (2013.01)

(58) Field of Classification Search
CPC . B25G 1/102; B25G 5/00; B25G 3/26; B27G 15/00; B23B 27/065
See application file for complete search history.

(56) References Cited

U.S. PATENT DOCUMENTS

| | | | |
|---|---|---|---|
| 221,552 A | 11/1879 | Hanson |
| 541,673 A | 6/1895 | Peabody |
| 2,362,711 A | 11/1944 | Moore |
| 2,914,098 A | 11/1959 | McLennan |
| 4,126,165 A | 11/1978 | Guignard |
| 4,754,787 A | 7/1988 | Smith |

(Continued)

FOREIGN PATENT DOCUMENTS

| | | | | |
|---|---|---|---|---|
| DE | 328185 C | * | 10/1920 | ............. B23B 27/16 |
| EP | 0143207 A1 | * | 6/1985 | ......... B23B 27/1662 |
| GB | 130717 A | * | 7/1919 | ........... B23B 27/065 |

OTHER PUBLICATIONS

Ball Grip, "https://www.vesseltools.com/handtools/screwdrivers/ballgrip" accessed Jun. 17, 2019.

(Continued)

*Primary Examiner* — Alan Snyder (74) *Attorney, Agent, or Firm* — George A. Leone; Mark D. Miller (57) ABSTRACT

A handheld wood thread cutting tool with an elongated shank formed with a planar surface and including a first end and a second end with a length substantially longer than its width. The first end has a first wood thread cutting edge aligned substantially in parallel relative to a first vertical plane perpendicular to the planar surface and passing through the length of the elongated shank from the first end to the second end. The second end has a second wood thread cutting edge aligned substantially parallel to a second vertical plane perpendicular to the planar surface and running through the width of the elongated shank from a first side wall to a second side wall. A ball handle is affixed between the first and the second end.

32 Claims, 6 Drawing Sheets

(56) References Cited

U.S. PATENT DOCUMENTS

| | | |
|---|---|---|
| 5,682,933 A | 11/1997 | Martel |
| 6,253,812 B1 | 7/2001 | Rinehart |
| 8,708,007 B2 | 4/2014 | Jackson |
| 8,800,613 B2 | 8/2014 | Batty |
| 2019/0299389 A1* | 10/2019 | Tsai ................ B25B 15/008 |

OTHER PUBLICATIONS

Sorby Pair of thread cutters, 10tpi, "https://www.toolpost.co.uk/product/sorby-pair-thread-cutters-10tpi," accessed Feb. 28, 2020.

* cited by examiner

HANDHELD WOOD THREAD CUTTING TOOL

TECHNICAL FIELD

The present invention relates to a handheld wood thread cutting tool, and, more particularly, to a handheld wood thread cutting tool having a handle substantially centered between two cutting edges.

BACKGROUND

Wood thread cutting tools, often called "thread chasers", are typically used for cutting screw threads in or around wooden surfaces while a piece of wood is being shaped on a lathe or the like. Thread chasers come in a wide range of pitches, measured in teeth per inch (TPI). A matching set of chasers for male and female threads with the same pitch is typically used to create male and female mating parts. As currently available a set of chasers consists of two separate tools with two separate handles.

The inventors hereof have provided, for the first time, a single tool which can be used for creating male and female screw threads on a wood piece rotating on a lathe.

BRIEF SUMMARY OF THE DISCLOSURE

This summary is provided to introduce, in a simplified form, a selection of concepts that are further described below in the Detailed Description. This summary is not intended to identify key features of the claimed subject matter, nor is it intended to be used as an aid in determining the scope of the claimed subject matter.

Provided herein is a handheld wood thread cutting tool with an elongated shank formed with a planar surface and including a first end and a second end with a length substantially longer than its width. The first end has a first wood thread cutting edge aligned substantially in parallel relative to a first vertical plane perpendicular to the planar surface and passing through the length of the elongated shank from the first end to the second end. The second end has a second wood thread cutting edge aligned substantially parallel to a second vertical plane perpendicular to the planar surface and running through the width of the elongated shank from a first side wall to a second side wall. A ball handle is affixed to the shank between the first and the second end.

BRIEF DESCRIPTION OF THE DRAWINGS

While the novel features of certain embodiments of the invention are set forth with particularity in the appended claims, the invention, both as to organization and content, will be better understood and appreciated, along with other objects and features thereof, from the following detailed description taken in conjunction with the drawings, in which:

In the drawings, identical reference numbers identify similar elements or components. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

The following disclosure describes a handheld wood thread cutting tool. Several features in accordance with example embodiments are set forth and described in the figures. It will be appreciated that features in accordance with other example embodiments can include additional features different than those shown in the figures. Example embodiments are described herein with respect to a handheld wood thread cutting tool with a wood thread cutting edge at each end. However, it will be understood that these examples are for illustrating the principles, and that the invention is not so limited.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one example," "an example embodiment," "one embodiment," "an embodiment" or combinations and/or variations of these terms means that a particular feature, structure or characteristic described in connection with the embodiment or example is included in at least one embodiment or example of the present disclosure. Thus, the appearances of the phrases "in one example" or "in an example" in various places throughout this specification are not necessarily all referring to the same embodiment or example. Furthermore, the particular features, structures, or characteristics may be combined in any suitable manner in one or more embodiments or examples.

Definitions

Generally, as used herein, the following terms have the following meanings:

The articles "a" or "an" and the phrase "at least one" as used herein refers to one or more.

Nominal dimensions where indicated will be understood to have a tolerance of plus or minus 10%.

As used herein, "plurality" is understood to mean more than one. For example, a plurality refers to at least 2, 3, 4, 5, 70, or more.

"Obtaining" is understood herein as manufacturing, purchasing, or otherwise coming into possession of.

Example Embodiments

The handheld wood thread cutting tool disclosed herein has several advantages over known handheld wood thread cutting tools and/or thread chasers. One advantage is that dual opposing cutting edges are included on a single tool. Another advantage is that an interchangeable comfort feel handle that can be used with a variety of tools having differing thread pitches is provided.

Figure 1:
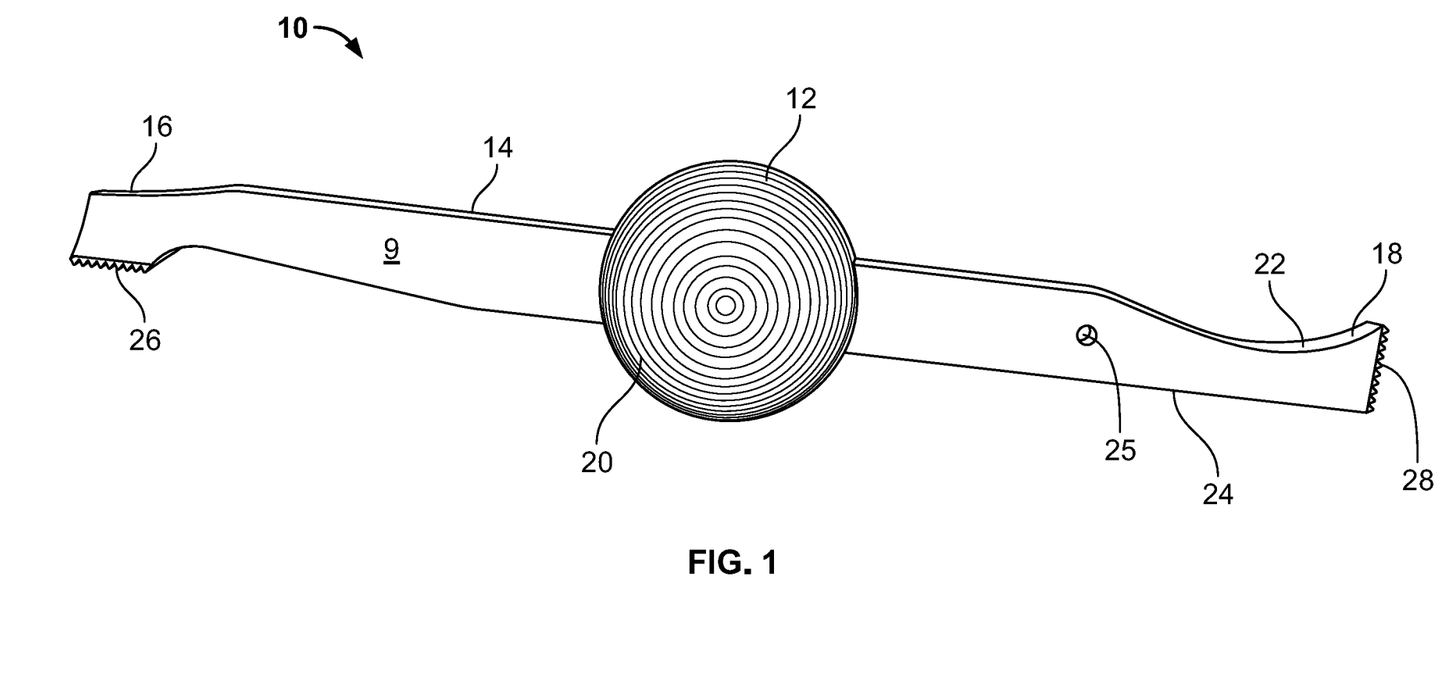
FIG. 1 schematically shows an example of a handheld wood thread cutting tool.

Referring now to FIG. 1, an example of a handheld wood thread cutting tool is schematically shown. A handheld wood thread cutting tool 10 includes a ball handle 12 attached to an elongated shank 14. The elongated shank 14 includes a planar surface 9, a shank first end 16 and an opposing shank second end 18. A first wood thread cutting edge 26 is located proximate the shank first end 16 and a second wood thread cutting edge 28 is located at the shank second end 18. The shank 14 has a first side wall 22 and a second side wall 24 substantially parallel to and opposite the first side wall 22. A tooling hole 25 may advantageously be located in the shank 14 to allow the elongated shank 14 to be held in position during heat treatment of the shank. A ball handle 12 has ripples or dimples 20 impressed upon the surface for handling comfort.

Figure 2:
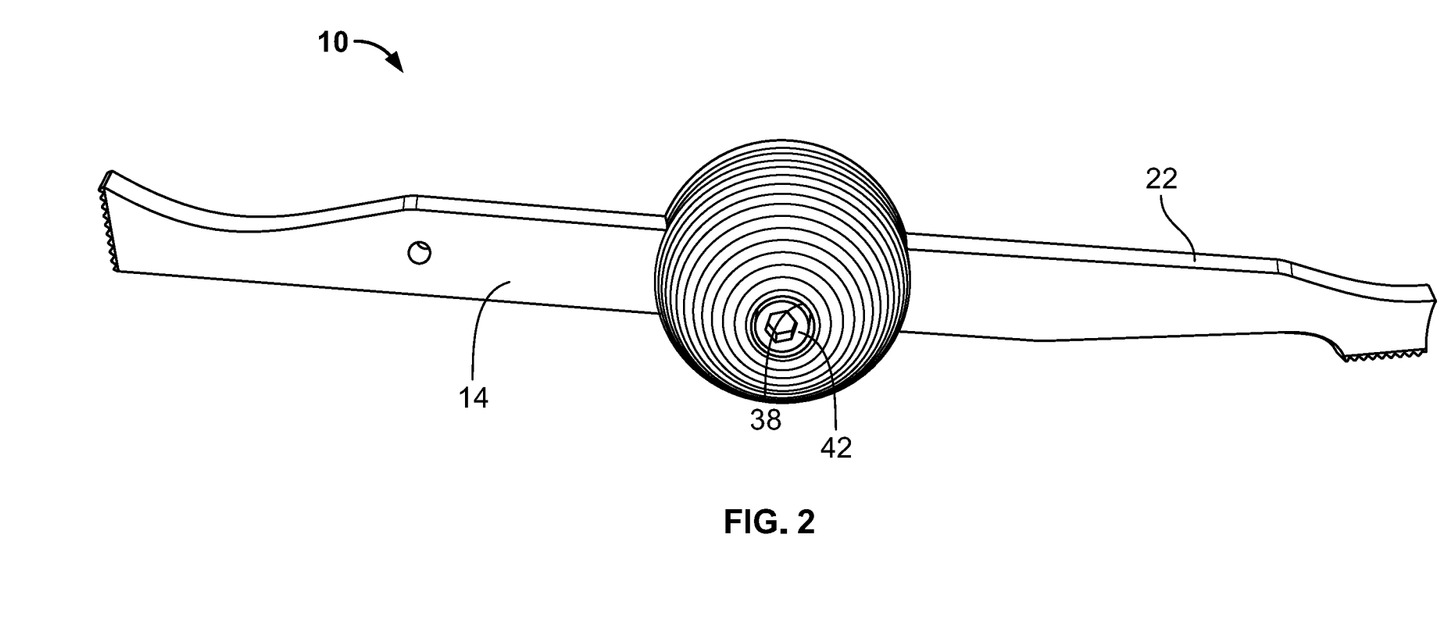
FIG. 2 schematically shows a bottom view of an example of a handheld wood thread cutting tool.

Referring now to FIG. 2, a bottom view of an example of a handheld wood thread cutting tool is schematically shown. A fastener 38 may advantageously be used to fasten the ball handle 12 to the shank 14. In one example, the fastener 38 may be an Allen head cap screw which fits into an aperture 42 in the bottom of the ball handle 12. In one useful embodiment the ball handle is attached to the center of the shank.

Figure 3:
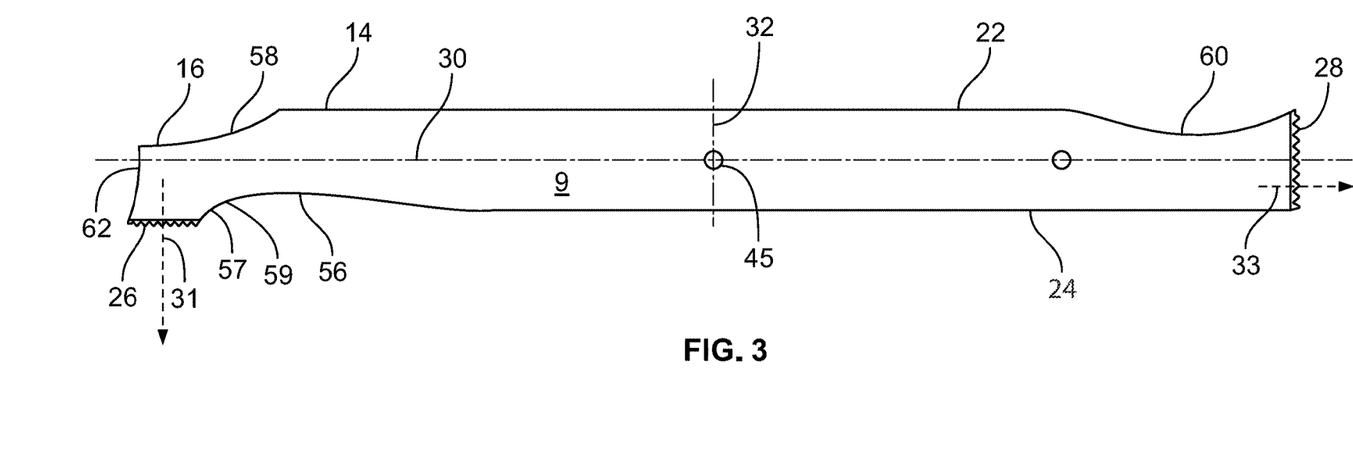
FIG. 3 schematically shows an example of a shank as used in a handheld wood thread cutting tool.

Referring now to FIG. 3, an example of a shank as used in a handheld wood thread cutting tool is schematically shown. The elongated shank 14 advantageously comprises a plurality of curvatures 56, 58, 60 formed into the walls 22, 24. A side curvature 62 may advantageously be formed into the first shank end 16. A center hole 45 is provided for allowing a fastener to be inserted through the shank. In one example the surface 9 may be substantially a flat planar surface. For purposes of spatial relationship, a first vertical plane perpendicular to the surface 9 and running across the length of the elongated shank from the first end to the second end is shown as broken line 30. A second vertical plane perpendicular to the surface 9 and the first vertical plane 30 runs across the width of the elongated shank from the first side wall to the second side wall shown as broken line 32. In one useful embodiment, the ID thread cutting edge 26 is oriented parallel to the first vertical plane with the teeth facing a direction perpendicular to the first vertical plane as indicated by directional arrow 31. The OD thread cutting edge 28 is oriented parallel to the second vertical plane with its teeth facing a direction perpendicular to the second vertical plane as indicated by directional arrow 33.

The plurality of curvatures provide relief, or clearance, when the tool is presented to a wooden workpiece. In one useful example, the curvature 60 has a radius of about 1.5 inches over an arc of about 2 inches. The curvature 58 has a nominal radius of about 4 inches. Curvature 62 is an arc with the radius of about 1.5 inches nominally. Curvature 56 has a nominal radius of about 1.5 inches. Shorter arcs 57 and 59 may adjoin curvature 56, each having a nominal radius of about 0.375 inches. The overall length of the shank in this example is nominally about 9 inches. The OD cutting edge 28 may nominally be about 0.625 inches in length. The ID cutting edge may be of a similar length.

Figure 4:
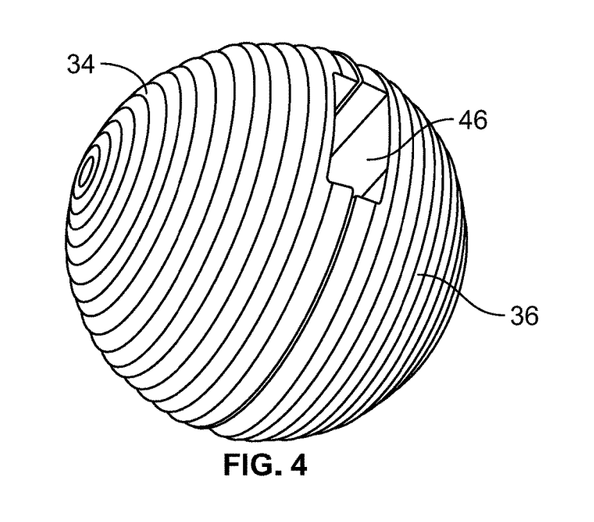
FIG. 4 schematically shows an example of joining top and bottom hemispheres of a handle for a handheld wood thread cutting tool.

Referring now to FIG. 4, an example of joining top and bottom hemispheres of a handle for a handheld wood thread cutting tool is schematically shown. A top hemisphere 34 and a bottom hemisphere 36 may be joined together to form a ball handle. Each of the top hemisphere 34 and the bottom hemisphere 36 includes a slot 44, 46 respectively that when aligned provide an opening for the elongated shank.

Figure 5A:
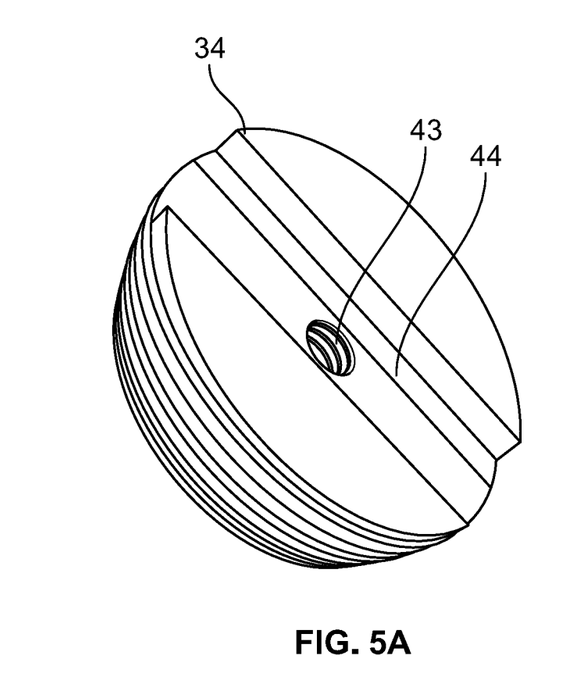
FIG. 5A schematically shows an example of a top hemisphere of a handle for a handheld wood thread cutting tool.

Referring now to FIG. 5A, an example of a top hemisphere of a handle for a handheld wood thread cutting tool is schematically shown. The top hemisphere 34 includes the slot 44 and a threaded aperture 43.

Figure 5B:
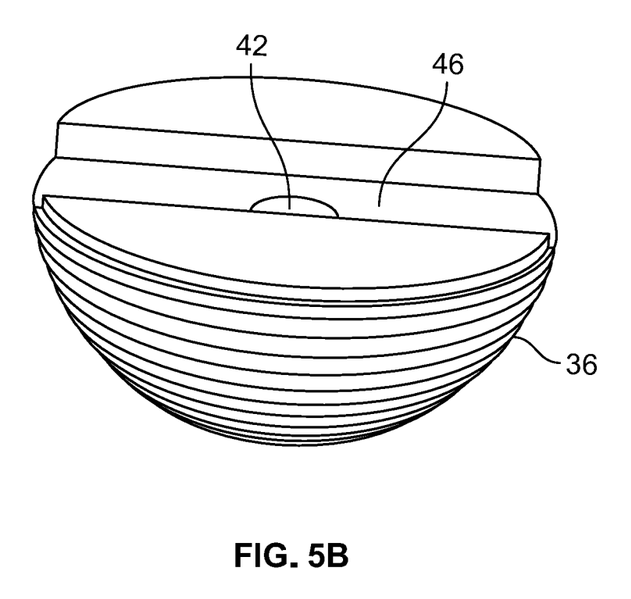
FIG. 5B schematically shows an example of a bottom hemisphere of a handle for a handheld wood thread cutting tool.

Referring now to FIG. 5B, an example of a bottom hemisphere of a handle for a handheld wood thread cutting tool is schematically shown. The bottom hemisphere 36 includes a cylindrical channel 42 and the slot 46. In use, the top hemisphere and bottom hemisphere are joined together sandwiching the shank therebetween. A fastener, such as an Allen head cap screw can be inserted through the cylindrical channel 42, center hole 45 and screwed into threaded aperture 43 to affix the handle to the shank thereby forming a complete handheld threading tool. The slots 44 and 46 are substantially identical in size and shape and are made to securely hold the elongated shank in place when aligned and joined to each other.

Figure 6:
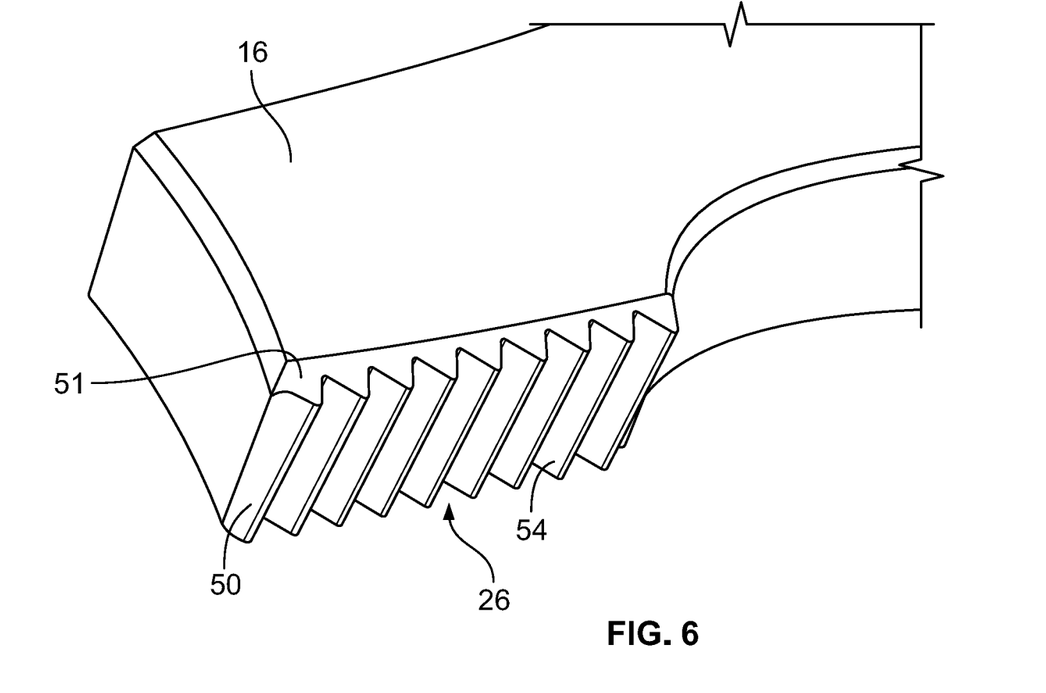
FIG. 6 schematically shows an example of an inside diameter threading head for use in a handheld wood thread cutting tool.

Referring now to FIG. 6, an example of an inner diameter (ID) threading head for use in a handheld wood thread cutting tool is schematically shown. The inner diameter threading head 26 includes a first plurality of cutting teeth 54. Located at an outer edge of the ID threading head 26 is a first tooth 50. A first negative rake 51 above the teeth may nominally have an edge with about a 10° bevel angle.

Figure 7:
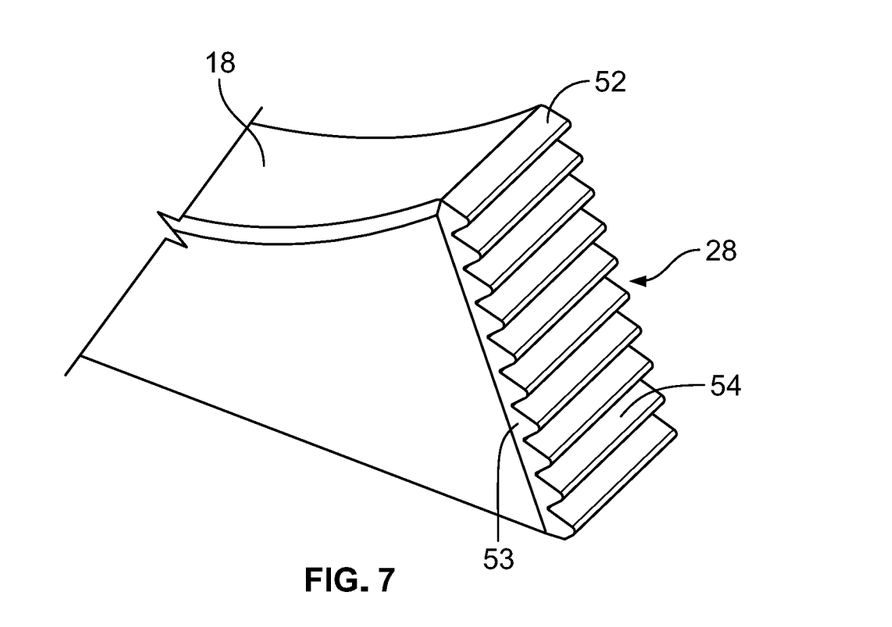
FIG. 7 schematically shows an example of an outside diameter threading head for use in a handheld wood thread cutting tool.

Referring now to FIG. 7, an example of an outer diameter (OD) threading head for use in a handheld wood thread cutting tool is schematically shown. The outer diameter threading head 28 includes a second plurality of cutting teeth 54. Located at and outer edge of the ID threading head 28 is a first tooth 52. A second negative rake 53 may nominally have an edge with about a 10° bevel angle. In one example, the cutting teeth are inwardly angled at about 18°. The cutting teeth also may have an angled slant of about 3° to provide an angled screw thread.

In most useful examples, the OD threading head will complement the ID threading head. That is, they will have the same pitch or threads per inch (TPI). Examples of threads per inch that may be employed include any typically used for threading wooden workpieces, these include, for example teeth per inch ranging from 10 TPI to about 26 TPI. More preferably, the thread cutting heads may have pitches of 10 TPI, 16 TPI and 20 TPI. Of course, the invention is not so limited and other ranges of thread pitches may also be useful and incorporated into the handheld threading tool disclosed herein.

As can be discerned from the construction of the tool, one advantage is that different shanks having varying thread pitches can be used interchangeably on the same ball handle. Thus, a kit with a set of shanks of varying cutting head pitches can be supplied thereby lowering the cost for the end-user.

Figure 8:
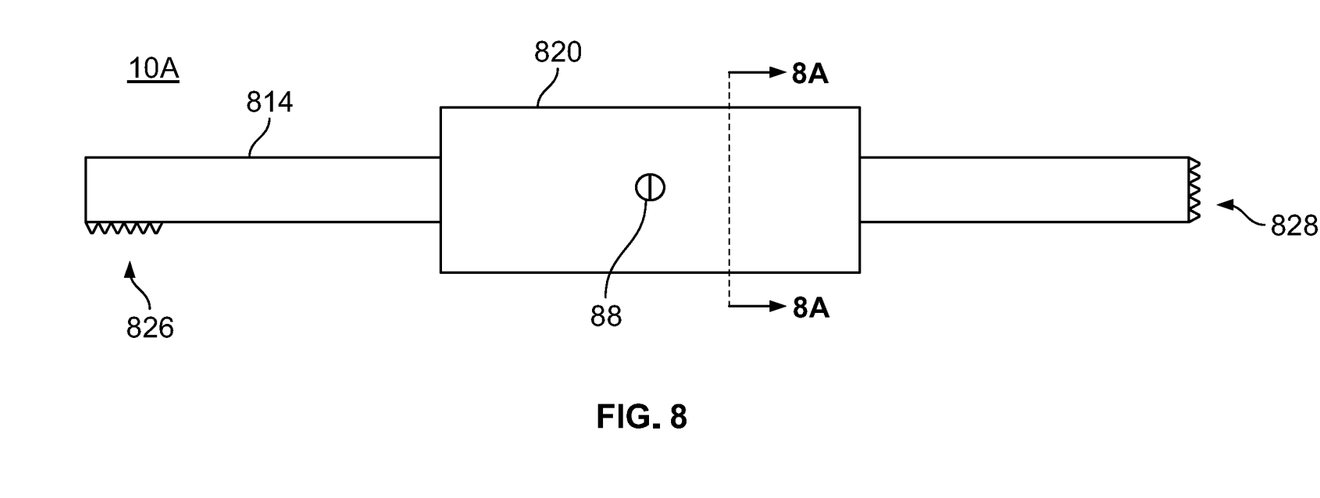
FIG. 8 schematically shows an example of an alternate embodiment of a handheld wood thread cutting tool.

Referring now to FIG. 8, an example of an alternate embodiment of a handheld wood thread cutting tool is schematically shown. In this example, a wood thread cutting tool 10A includes a cylindrical shank 814 joined to a solid cylindrical handle 820 by means of a set screw 88 or the like. ID thread cutting teeth 826 and OD thread cutting teeth 828 may be machined into opposite ends of the cylindrical shank 814.

Figure 8A:
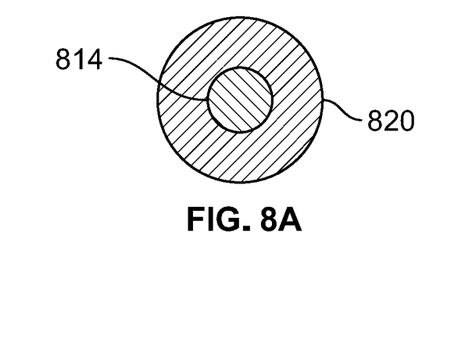
FIG. 8A schematically shows a cross section of the handheld wood thread cutting tool of FIG. 8.

Referring now to FIG. 8A, a cross section of the handheld wood thread cutting tool of FIG. 8 is schematically shown. In one example embodiment, the cylindrical shank 814 may be concentrically aligned within the cylindrical handle 820. Those skilled in the art will recognize that various other geometric shapes may be used for both the handle and the shank. For example, the cylindrical handle 820 may include a slot for snapping onto the cylindrical shank 814 in place of a set screw or the like. Other handle shapes can be square, oblong or ergonometric compatible shapes.

In one example, the shank is made of M42 grade high speed steel and the ball handle is aluminum. Other materials that may be used for the handle include plastic, wood, steel and the like. The shank may also comprise other high speed steels (i.e. M2 or M4 grade steel), powdered metal, carbide, combinations of those materials and the like. In one useful example the thickness of the shank material is nominally ¼". Both the ball handle and the shank may be manufactured using CNC machining. As will be appreciated by those skilled in the art having the benefit of this disclosure, if desired, the handheld wood thread cutting tool may be made as an integrated shank and handle.

Certain exemplary embodiments of the invention have been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by different equipment, and devices, and that various modifications, both as to the equipment details and operating procedures, may be accomplished without departing from the true spirit and scope of the present invention.

What is claimed is:

1. A handheld wood thread cutting tool comprising: an elongated shank including a first end and a second end opposite the first end, the elongated shank being formed with a planar surface, having a length substantially longer than its width, and having a first side wall and a second side wall opposing the first sidewall; the first end having a first wood thread cutting edge aligned substantially in parallel relative to a first vertical plane perpendicular to the planar surface and running across the length of the elongated shank from the first end to the second end; the second end having a second wood thread cutting edge aligned substantially parallel to a second vertical plane perpendicular to the planar surface and the first vertical plane, and running across the width of the elongated shank from the first side wall to the second side wall; and a ball handle affixed to the shank between the first and the second end.

2. The tool of claim 1 wherein the ball handle further comprises a rippled or dimpled surface.

3. The tool of claim 1 wherein the first wood thread cutting edge comprises a negative rake at one edge.

4. The tool of claim 1 wherein the second wood thread cutting edge comprises a negative rake at one edge.

5. The tool of claim 1 further comprising a fastener fastening the ball handle to the shank.

6. The tool of claim 1 wherein the elongated shank comprises at least one curvature formed into at least one of said sidewalls adjacent to one of said cutting edges.

7. The tool of claim 6 wherein said at least one curvature is configured to provide clearance when the tool is presented to a wooden workpiece.

8. The tool of claim 1 wherein the ball handle comprises: a top hemisphere and a bottom hemisphere, each having a slot wherein the top hemisphere and the bottom hemisphere may be joined together to form the ball handle and where the slots are sized to be aligned to provide an opening for the elongated shank; wherein the top hemisphere includes a threaded aperture; and wherein the bottom hemisphere includes a cylindrical channel sized to receive a fastener.

9. The tool of claim 8 wherein the elongated shank includes a center hole positioned and sized to be aligned with the top hemisphere and bottom hemisphere and joined together with a fastener sandwiching the shank therebetween.

10. The tool of claim 1 wherein the first wood thread cutting edge includes an inner diameter (ID) threading head having a first plurality of cutting teeth.

11. The tool of claim 1 wherein the second wood thread cutting edge includes an outer diameter (OD) threading head having a second plurality of cutting teeth.

12. The tool of claim 10 wherein the plurality of cutting teeth have a pitch ranging from 10 TPI to 26 TPI.

13. The tool of claim 11 wherein the plurality of cutting teeth have a pitch ranging from 10 TPI to 26 TPI.

14. A handheld wood thread cutting tool comprising: an elongated shank including a first end and a second end opposite the first end, the elongated shank being formed with a planar surface, having a length substantially longer than its width, and having a first sidewall and a second sidewall each of the opposing sidewalls having a plurality of curvatures; the first end having a first wood thread cutting edge, including a first negative rake at one edge, aligned substantially in parallel relative to a first vertical plane perpendicular to the planar surface and running across the length of the elongated shank from the first end to the second end; the second end having a second wood thread cutting edge, including a second negative rake at one edge, aligned substantially parallel to a second vertical plane perpendicular to the planar surface and the first vertical plane and running across the width of the elongated shank from the first side wall to the second side wall; and a ball handle with a rippled or dimpled surface, the ball handle being affixed to the shank between the first and the second end.

15. The tool of claim 14 further comprising a fastener to fasten the ball handle to the shank.

16. The tool of claim 14 wherein the ball handle comprises: a top hemisphere and a bottom hemisphere, each having a slot wherein the top hemisphere and the bottom hemisphere may be joined together to form the ball handle and where the slots are sized to be aligned to provide an opening for the elongated shank; wherein the top hemisphere includes a threaded aperture; and wherein the bottom hemisphere includes a cylindrical channel sized to receive a fastener.

17. The tool of claim 16 wherein the elongated shank includes a center hole positioned and sized to be aligned with the top hemisphere and bottom hemisphere and joined together with a fastener sandwiching the shank therebetween.

18. The tool of claim 14 wherein the first wood thread cutting edge includes an inner diameter (ID) threading head having a first plurality of cutting teeth.

19. The tool of claim 14 wherein the second wood thread cutting edge includes an outer diameter (OD) threading head having a second plurality of cutting teeth.

20. The tool of claim 18 wherein the plurality of cutting teeth have a pitch ranging from 10 TPI to 26 TPI.

21. The tool of claim 19 wherein the plurality of cutting teeth have a pitch ranging from 10 TPI to 26 TPI.

22. A handheld wood thread cutting tool comprising: an elongated shank including a first end and a second end opposite the first end, the elongated shank being formed with a cylindrical surface, having a length substantially longer than its diameter; the first end having a first wood thread cutting edge; the second end having a second wood thread cutting edge; and a cylindrical handle affixed between the first and the second end.

23. A kit for a handheld wood thread cutting tool comprising: at least one elongated shank including a first end and a second end opposite the first end, the elongated shank being formed with a planar surface, having a length substantially longer than its width, and having a first side wall and a second side wall opposing the first sidewall; the first end having a first wood thread cutting edge aligned substantially in parallel relative to a first vertical plane perpendicular to the planar surface and running across the length of the elongated shank from the first end to the second end; the second end having a second wood thread cutting edge aligned substantially parallel to a second vertical plane perpendicular to the planar surface and the first vertical plane, and running across the width of the elongated shank from the first side wall to the second side wall; and a ball handle adapted to be affixed to the at least one elongated shank between the first and the second end.

24. The kit of claim 23 wherein the ball handle further comprises a rippled or dimpled surface.

25. The kit of claim 23 wherein the first wood thread cutting edge comprises a first negative rake at one edge.

26. The kit of claim 23 wherein the second wood thread cutting edge comprises a second negative rake at one edge.

27. The kit of claim 23 further comprising a fastener adapted to affix the ball handle to the shank.

28. The kit of claim 23 wherein the ball handle comprises: a top hemisphere and a bottom hemisphere, each having a slot wherein the top hemisphere and the bottom hemisphere may be joined together to form the ball handle and where the slots are sized to be aligned to provide an opening for the elongated shank; wherein the top hemisphere includes a threaded aperture; and wherein the bottom hemisphere includes a cylindrical channel sized to receive a fastener.

29. A handheld wood thread cutting tool comprising: an elongated shank having a length substantially longer than its width and a first end and a second end opposite the first end, a first wood thread cutting edge at said first end, a second wood thread cutting edge at said second end, and a ball handle affixed to the shank between the first end and the second end.

30. The tool of claim 29 wherein the elongated shank comprises at least one curvature formed into a sidewall of said shank adjacent to one of said cutting edges.

31. The tool of claim 30 wherein said at least one curvature is configured to provide clearance when the tool is presented to a wooden workpiece.

32. The tool of claim 29 wherein the ball handle comprises a top hemisphere and a bottom hemisphere, each hemisphere having a slot therein to provide an opening for the elongated shank when said hemispheres are joined together.

* * * * *